United States Patent
Furusho et al.

(10) Patent No.: US 7,553,394 B2
(45) Date of Patent: Jun. 30, 2009

(54) METHOD FOR REMOVING POTASSIUM FROM ASH PRODUCED IN A KRAFT PULPING PROCESS RECOVERY BOILER USING A NA-TYPE CATION EXCHANGE ORGANIC RESIN

(75) Inventors: Saburo Furusho, Toshima-ku (JP); Norio Kawano, Yokohama (JP); Shigeru Wakamoto, Niigata (JP)

(73) Assignees: Nippon Rensui Co., Tokyo (JP); Hokuetsu Paper Mills, Ltd., Niigata-ken (JP)

( * ) Notice: Subject to any disclaimer, the term of this patent is extended or adjusted under 35 U.S.C. 154(b) by 689 days.

(21) Appl. No.: 10/533,460

(22) PCT Filed: Sep. 11, 2003

(86) PCT No.: PCT/JP03/11606

§ 371 (c)(1),
(2), (4) Date: May 2, 2005

(87) PCT Pub. No.: WO2004/042140

PCT Pub. Date: May 21, 2004

(65) Prior Publication Data

US 2006/0219375 A1    Oct. 5, 2006

(30) Foreign Application Priority Data

Nov. 5, 2002   (JP) ............................. 2002-320651

(51) Int. Cl.
*D21C 3/26*   (2006.01)
(52) U.S. Cl. ................ 162/17; 210/660; 210/670; 162/29; 162/30.1; 162/31; 162/35; 162/37
(58) Field of Classification Search ............. 162/17; 260/600; 210/660
See application file for complete search history.

(56) References Cited

U.S. PATENT DOCUMENTS 5,616,280 A  *  4/1997  Moore et al. ........... 252/186.29

(Continued)

FOREIGN PATENT DOCUMENTS

JP       52-140702 A        11/1977

(Continued)

OTHER PUBLICATIONS

English Machine translation of JP 2002-138382 Kono et al.*

(Continued)

*Primary Examiner*—Eric Hug
*Assistant Examiner*—Anthony J Calandra
(74) *Attorney, Agent, or Firm*—Nixon & Vanderhye P.C.

(57) ABSTRACT

In the process for producing kraft pulp, performing a potassium ion removal step of flowing an aqueous solution containing ashes recovered from a combustion exhaust gas generated in a black solution combustion step by a dust collector through a packed bed filled with a sodium-type cation exchange organic resin to adsorb and remove potassium ions contained in the aqueous solution; and a regeneration step of treating the cation exchange organic resin used in the potassium ion removal step with a solution consisting essentially of aqueous sodium hydroxide to regenerate the cation exchange resin, where a fraction recovered from the potassium ion removal step which is rich in sodium sulfate and sodium carbonate is recycled to the black solution concentrating step, and a sodium hydroxide effluent recovered from the regeneration step is recycled to a bleaching step and used in a bleaching process.

1 Claim, 2 Drawing Sheets

U.S. PATENT DOCUMENTS

| | | | |
|---|---|---|---|
| 5,628,874 A | 5/1997 | Lindberg et al. | |
| 5,922,171 A | 7/1999 | Paleologou et al. | |
| 5,980,717 A | 11/1999 | Pudas et al. | |

FOREIGN PATENT DOCUMENTS

| | | |
|---|---|---|
| JP | 5-171586 A | 7/1993 |
| JP | 2002-138382 A | 5/2002 |
| JP | 2002-146691 A | 5/2002 |

OTHER PUBLICATIONS

Smook, Handbook for Pulp and Paper Technologists, 1992, Angus Wilde Publications, 2nd Edition, p. 74-77, 148-150, 163-164, 174-175.*

* cited by examiner

METHOD FOR REMOVING POTASSIUM FROM ASH PRODUCED IN A KRAFT PULPING PROCESS RECOVERY BOILER USING A NA-TYPE CATION EXCHANGE ORGANIC RESIN

This application is the U.S. national phase of international application PCT/JP 2003/011606 filed 11 Sep. 2003, which designated the U.S. and claims priority of JP 2002-320651, filed 5 Nov. 2002, the entire contents of each of which are hereby incorporated by reference.

TECHNICAL FIELD

The present invention relates to a process for producing kraft pulp.

BACKGROUND ART

As well known in the art, the process for producing kraft pulp basically comprises: (A) a cooking step of treating raw chips with a cooking liquor containing sodium hydroxide and sodium sulfide as main components to convert the chips into pulp; (B) a pulp washing step of washing the resultant pulp, and separating and recovering a black solution containing sodium carbonate and sodium sulfate, which are turned from the cooking liquor; (C) a pulp bleaching step of treating the pulp with a bleaching agent in the presence of alkali; (D) a black solution concentrating step of concentrating the black solution separated and recovered in the pulp washing step (B); (E) a black solution combustion step of burning the concentrated black solution to reduce sodium sulfate into sodium sulfide and further recovering sodium sulfate and sodium carbonate from a combustion exhaust gas by a dust collector; and (F) a causticization step of treating a green solution as an aqueous solution of a smelted product recovered in the combustion step with calcium oxide to convert sodium carbonate contained in the green solution into sodium hydroxide, thereby obtaining a white solution, wherein the white solution recovered in the causticization step (F) is recycled to the cooking step (A).

In the above-described process for producing kraft pulp, chemicals used therein have been recovered in a closed system to enhance a recovery percentage thereof more and more. More specifically, sodium carbonate or sodium sulfate has also been recovered from ashes captured and recovered from a combustion exhaust gas generated in the combustion step (E) by the dust collector.

Meanwhile, in the case where valuable substances are recovered from the captured ashes as described above, it is required to remove impurities turned from raw wood materials, for example, potassium components in order to prevent accumulation of these impurities in the recovered valuable substances.

As a method of removing common salt (sodium. chloride) and potassium salts from ashes captured in a sodium-recovering boiler, there has been proposed the method of adjusting a pH value of a water slurry containing the captured ashes to not more than 10 by adding sulfuric acid thereto and further adjusting a temperature of the water slurry to not less than 20° C.; keeping the water slurry under the above condition for a predetermined period of time to dissolve common salt and potassium salts contained in the captured ashes in water; cooling the resultant water slurry to a temperature less than 20° C. to precipitate solids; re-dissolving the solids in the black solution before being concentrated; and returning the resultant black solution to an upstream side of a concentrator for the black solution, thereby recovering the solids (Japanese Patent Application Laid-Open (KOKAI) No. 9-29201 (1997)).

However, the above conventional method has the following problems: (1) a loss of valuable substances is large since a large amount of these substances are contained in an effluent discharged out of the system; (2) a large amount of dilute sulfuric acid should be used for enhancing a sodium recovery percentage; (3) increased costs are required for operating an ice maker for producing ice used in a precipitation tank; (4) running costs are disadvantageously large owing to these problems; and (5) equipments used tend to suffer from abrasion and deterioration due to the slurry.

Under these circumstances, in order to overcome the above problems, the present inventors have proposed as the method of treating ashes captured in a cooking chemical recovery step, such a method of treating an aqueous solution of the captured ashes with an ion exchange resin to recover and reuse a fraction containing a large amount of sulfate ions and carbonate ions (Japanese Patent Application Laid-Open (KOKAI) Nos. 2002-138381, 2002-138382 and 2002-146691).

In the above Japanese Patent Applications, there are described a step of adsorbing and removing potassium ions using Na-type strong acid ion exchange resins, a step of adsorbing and removing polyvalent metal ions using chelate resins, and a step of separating chlorine ions using ampholytic ion exchange resins. Further, in these Japanese Patent Applications, as a method of regenerating the Na-type strong acid ion exchange resins and chelate resins which need for regeneration of chemicals, there are described the method of flowing an acid (for example, an aqueous hydrochloric acid solution) through the resins and then flowing an aqueous sodium hydroxide solution or an aqueous sodium chloride solution through the resultant resins, and the method of flowing an acid (for example, an aqueous hydrochloric acid solution) through the resins and then flowing an aqueous sodium hydroxide solution through the resultant resins.

An object of the present invention is to provide an industrially useful process for producing kraft pulp, which is capable of recovering chemicals in a closed system, in particular, preventing, accumulation of potassium impurities, and effectively utilizing the chemicals used in the process.

DISCLOSURE OF THE INVENTION

Figure 1:
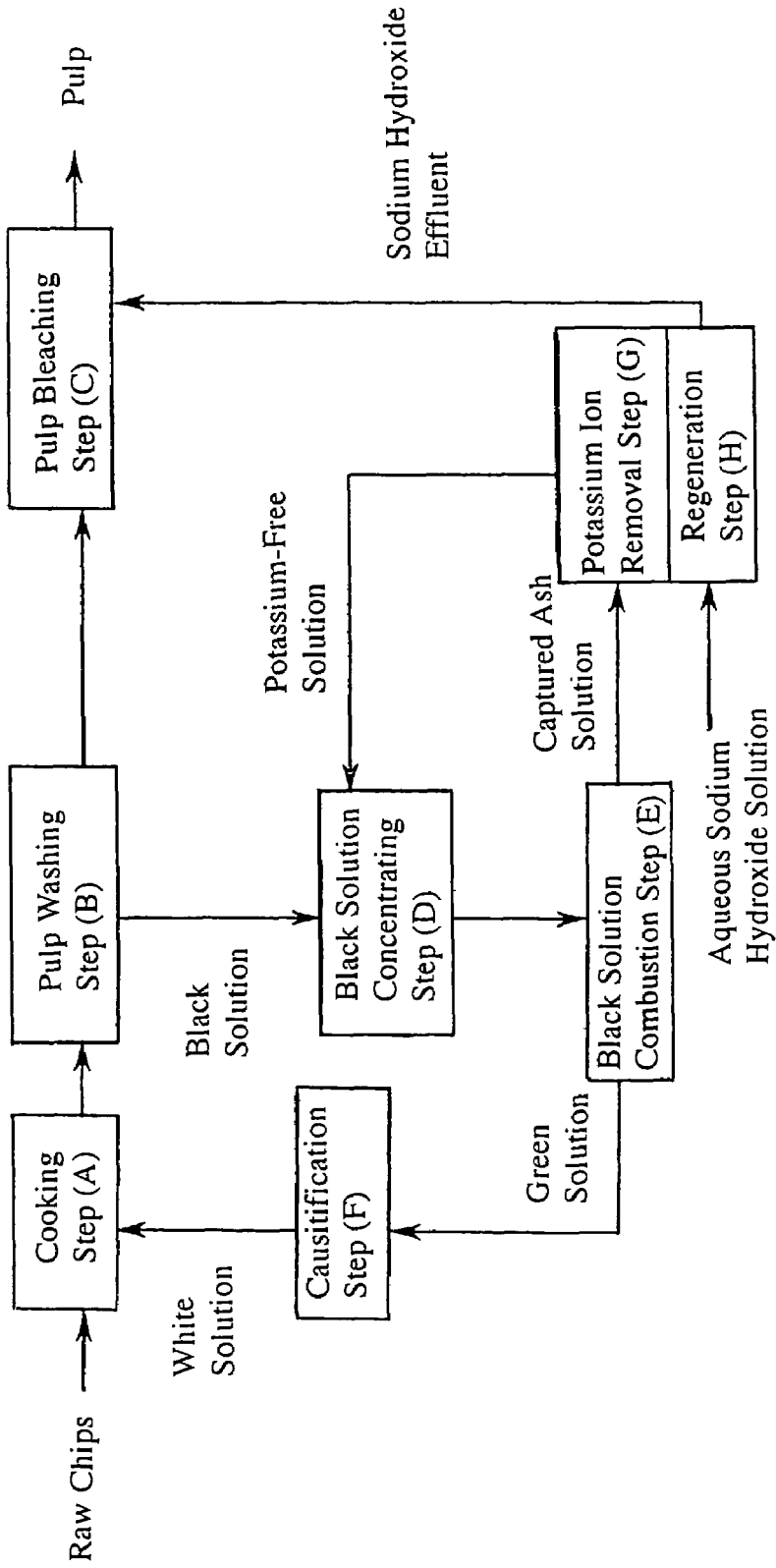
FIG. 1 is a flow diagram showing an example of the process for producing kraft pulp according to the present invention.

As a result of the present inventors' earnest study, the following knowledge has been obtained. That is, in the bleaching step of treating the pulp with a bleaching agent in the presence of alkali, as the alkali, there is usually used a high-purity sodium hydroxide. Meanwhile, in the case where the Na-type cation exchange resins are regenerated by the method of flowing an aqueous sodium hydroxide solution therethrough, a sodium hydroxide effluent containing a large amount of potassium ions is by-produced. Such a sodium hydroxide effluent can be used in the bleaching step with substantially same effect as obtained by the high-purity sodium hydroxide.

The present invention has been attained on the basis of this finding. Namely, in the present invention, as a method of regenerating the Na-type cation exchange resin, there is selected the regeneration method using an aqueous sodium hydroxide solution, and further the sodium hydroxide effluent obtained from the regeneration step is suitably utilized.

To accomplish the aim, in a first aspect of the present invention, there is provided a process for producing kraft pulp, which comprises (A) a cooking step of treating raw chips with a cooking liquor containing sodium hydroxide and sodium sulfide as main components to convert the chips into pulp; (B) a pulp washing step of washing the resultant pulp, and separating and recovering a black solution containing sodium carbonate and sodium sulfate, which are turned from the cooking liquor, therefrom; (C) a pulp bleaching step of treating the pulp with a bleaching agent in the presence of alkali; (D) a black solution concentrating step of concentrating the black solution separated and recovered in the pulp washing step (B); (E) a black solution combustion step of burning the concentrated black solution to reduce the sodium sulfate into sodium sulfide and further capturing and recovering ashes containing sodium sulfate and sodium carbonate from a combustion exhaust gas generated therein by a dust collector; and (F) a causticization step of treating a green solution as an aqueous solution of a smelted product recovered from the combustion step with calcium oxide to reduce sodium carbonate contained in the green solution to sodium hydroxide, thereby obtaining a white solution, the white solution recovered in the causticization step (F) being recycled to the cooking step (A);

the process further comprising:

(G) a potassium ion removal step of flowing an aqueous solution containing the ashes captured and recovered from the combustion exhaust gas generated in the black solution combustion step (E) by the dust collector through a packed bed filled with a Na-type cation exchange resin to adsorb and remove potassium ions contained in the aqueous solution; and (H) a regeneration step of treating the cation exchange resin used in the potassium ion removal step (G) with an aqueous sodium hydroxide solution to regenerate the cation exchange resin, wherein a fraction recovered from the potassium ion removal step (G), which contains a large amount of sodium sulfate and sodium carbonate, is recycled to the black solution concentrating step (D), and a sodium hydroxide effluent recovered from the regeneration step (H) is recycled to the bleaching step (C).

Next, the present invention is described in detail with reference to the accompanying drawings.

The process for producing kraft pulp according to the present invention basically comprises (A) a cooking step, (B) a pulp washing step, (C) a pulp bleaching step, (D) a black solution concentrating step, (B) a black solution combustion step and (F) a causticization step. These steps may be conducted under known conditions.

In the cooking step (A), raw chips are treated with a cooking liquor containing sodium hydroxide and sodium sulfide as main components in a digester to convert the chips into pulp. The treatment of the raw chips may be conducted under high-temperature and high-pressure conditions, at a temperature of usually 150 to 160° C. under a pressure of usually 8.5 to 9.5 Kg/cm$^2$G.

In the pulp washing step (B), the pulp obtained in the step (A) is washed with a washing solution, and the resultant black solution (i.e., the resultant washing solution containing the pulp cooking liquor) containing sodium carbonate and sodium sulfate, which are turned from the cooking liquor, is separated and recovered from the pulp. The black solution contains organic substances contained in the chips in addition to the chemical components. The solid content in the black solution is in the range of usually 15 to 25% by weight.

In the pulp bleaching step (C), the pulp is treated with a bleaching agent in the presence of alkali. In this step, the pulp is treated with not only a single chemical but also the following various chemicals. For example, there may be used a method (1) in which bleaching with chlorine or chlorine dioxide, alkali extraction, bleaching with hypochlorite and bleaching with chlorine dioxide are successively conducted; a method (2) in which bleaching with chlorine or chlorine dioxide, alkali extraction, bleaching with hypochlorite, alkali extraction and bleaching with chlorine dioxide are successively conducted, as well as methods in which a part of the above-mentioned these steps are omitted. The alkali extraction stage finishes a lignin removal step subsequent to steps composed of the cooking step, the bleaching step with oxygen and a chlorination step. In the alkali extraction stage, sodium hydroxide may be mainly used as the alkali. Further, in order to enhance the lignin removal efficiency, the alkali extraction stage may be conducted using hydrogen peroxide (Ep) or hypochlorite (EH) in combination with the alkali, and further using oxygen in combination therewith (Eop, EoH). Subsequent to the alkali extraction stage, for the purpose of removing residual high-condensed lignin, bleaching with hypochlorite and chlorine dioxide may be conducted, thereby obtaining bleached pulp stably exhibiting a high brightness. Recently, from environmental viewpoints, there has been adopted a chlorine-free bleaching (ECF) method using no chlorine nor hypochlorite.

In the black solution concentrating step (D), the black solution having a solid concentration of 15 to 25% by weight, which is discharged from the pulp washing step (B) is concentrated by an evaporator until the solution reaches a combustible concentration, usually until reaching a solid concentration of about 70 to 80% by weight.

In the black solution combustion step (E), the concentrated black solution is burned to reduce sodium sulfate into sodium sulfide. More specifically, the black solution is injected into a boiler to form a deposit called char having a temperature of about 1000° C. at a bottom thereof, and the char is burned therein to recover a smelted product (chemical components) melted at about 800° C. from the bottom of the boiler. In addition, in the black solution combustion step (E), ashes containing sodium sulfate and sodium carbonate are captured and recovered from the resultant combustion exhaust gas by a dust collector disposed in a flue of the boiler.

In the causticization step (F), a green solution as an aqueous solution of the smelted product recovered from the combustion step is treated with calcium oxide to convert sodium carbonate contained in the green solution into sodium hydroxide, thereby obtaining a white solution. Meanwhile, the calcium oxide is converted into lime sludge. Also, although not shown in FIG. 1, the causticization step (F) may further include a step of removing sludge from a milk solution (emulsion) containing the lime sludge to obtain a purified white solution, a step of burning the thus separated and removed lime sludge in a kiln to covert the sludge into calcium oxide again, or the like. The white solution converted in the causticization step (F) is reused as a cooking liquor in the cooking step (A).

In the process for producing kraft pulp according to the present invention, there are further provided (G) a potassium ion removal step of flowing an aqueous solution containing the ashes captured and recovered from the combustion exhaust gas generated in the black solution combustion step (E) by the dust collector, through a packed bed filled with a Na-type cation exchange resin to adsorb and remove potassium ions contained in the aqueous solution; and (H) a regeneration step of treating the cation exchange resin used in the potassium ion removal step (G) with an aqueous sodium hydroxide solution to regenerate the cation exchange resin.

In the potassium ion removal step (G), in the case where the ashes captured by a dry electric dust collector is dissolved in water, a warm water may be used in the consideration of a solubility of the captured ashes. On the other hand, in the case where a wet electric dust collector (mist Cottrell precipitator) is used for capturing the ashes, there may be used an ash-recovering solution obtained from a wet scrubber fitted thereto. The amount of water used for dissolving the captured ashes is usually 3 to 10 times (by weight) that of the captured ashes.

As the Na-type cation exchange resin, there may be suitably used, for example, "DIAION (registered trademark) UBK550", Na-type cationic resin with a sulfonic active group, produced by Mitsubishi Kagaku Co., Ltd. In order to form the packed column filled with the cation exchange resin, there may be used ordinary ion exchange columns. In addition, the fluid may be flowed through the packed column at a space velocity (SV) of usually 1 to 10 $hr^{-1}$ at a temperature of usually 20 to 80° C. When the fluid is continuously flowed under the above conditions, leakage of potassium ions from the column is soon initiated. At that time, the flowing of the fluid through the column is stopped.

In the regeneration step (H), the aqueous sodium hydroxide solution is flowed through the cation exchange resin to desorb the potassium ion adsorbed in the cation exchange resin therefrom. More specifically, in the previous potassium ion removal step (G), the supply of the aqueous solution containing the captured ashes is stopped upon initiation of the leakage of potassium ions from the packed column. In order to replace the aqueous solution containing the captured ashes which still remain in the ion exchange column, with water, an inside of the ion exchange column is washed with water. Successively, in order to regenerate the cation exchange resin, the aqueous sodium hydroxide solution is fed thereto. At this time, the concentration of the aqueous sodium hydroxide solution used is in the range of usually 2 to 20%. Upon the regeneration, the space velocity of the aqueous sodium hydroxide solution flowed through the cation exchange resin is in the range of usually 1 to 10 $hr^{-1}$, and the temperature thereof is in the range of usually 20 to 80° C. By continuously conducting the regeneration procedure, the potassium ions adsorbed in the cation exchange resin is desorbed therefrom, so that the cation exchange resin is regenerated into the Na-type cation exchange resin. When the above procedure is repeated, it is possible to continuously remove potassium ions from the aqueous solution containing the captured ashes.

Further, in the present invention, the fraction containing a large amount of sodium sulfate and sodium carbonate (potassium-free solution) is circulated to the black solution concentrating step (D), whereby a recovery percentage of the valuable components (sodium sulfate and sodium carbonate) can be enhanced.

Further, in the present invention, the sodium hydroxide effluent recovered in the above regeneration step (H) is reused in the previous bleaching step (C). More specifically, the sodium hydroxide effluent is supplied to the alkali extraction stage of the bleaching step (C). This enables effective use of the sodium hydroxide effluent discharged from the regeneration step. Besides, the use of the sodium hydroxide effluent in the same amount as conventionally can provide the same bleaching effect as conventionally attained. Therefore, according to the present invention, the supply of an additional amount of sodium hydroxide from an outside of the system is not required.

Meanwhile, in the present invention, there may be further provided, if required, one or both of a step for adsorptive removal of polyvalent metal ions with chelate resins and a step for separation of chlorine ions with ampholytic ion exchange resins (both not shown). In this case, the respective steps are preferably successively conducted in the order of the step for adsorptive removal of polyvalent metal ions, the step for separation of chlorine ions, and the potassium ion removal step (G).

PREFERRED EMBODIMENT FOR CARRYING OUT THE INVENTION

Thus, the present invention is carried out as described above. The essential parts of the process according to the present invention, namely the potassium ion removal step (G) and the regeneration step (H) as well as the bleaching step (C), are described in more detail below by referring to the Examples, but the Examples are only illustrative and, therefore, not intended to limit the scope of the present invention.

EXAMPLE 1

In the same process for producing kraft pulp as shown in FIG. 1, ashes captured and recovered from a combustion exhaust gas discharged from a recovery boiler used in the combustion step (E) by a dust collector were dissolved in pure water at 60° C. to obtain a 30 W/V % solution, and then the resultant solution was filtered through a 0.45 μm-mesh membrane filter, thereby obtaining a filtrate having a composition shown in Table 1.

TABLE 1

| | |
|---|---|
| pH | 10.5 |
| $Na^+$ | 78 [g/L] |
| $K^+$ | 23.6 [g/L] |
| $Cl^-$ | 13.7 [g/L] |
| $SO_4^{2-}$ | 149 [g/L] |
| $CO_3^{2-}$ | 27.3 [g/L] |

2000 mL of the raw solution (filtrate) maintained at 60° C. was flowed through a glass column having an inner diameter of 30 mm which was packed with 500 mL of a cation exchange resin "DIAION UBK550 (registered trademark)" produced by Mitsubishi Kagaku Co., Ltd., at a space velocity of 2 $hr^{-1}$ to adsorb potassium ions contained in the solution on the resin. Further, 1000 mL of pure water was flowed through the glass column at a space velocity of 2 $hr^{-1}$ to wash the resin.

Figure 2:
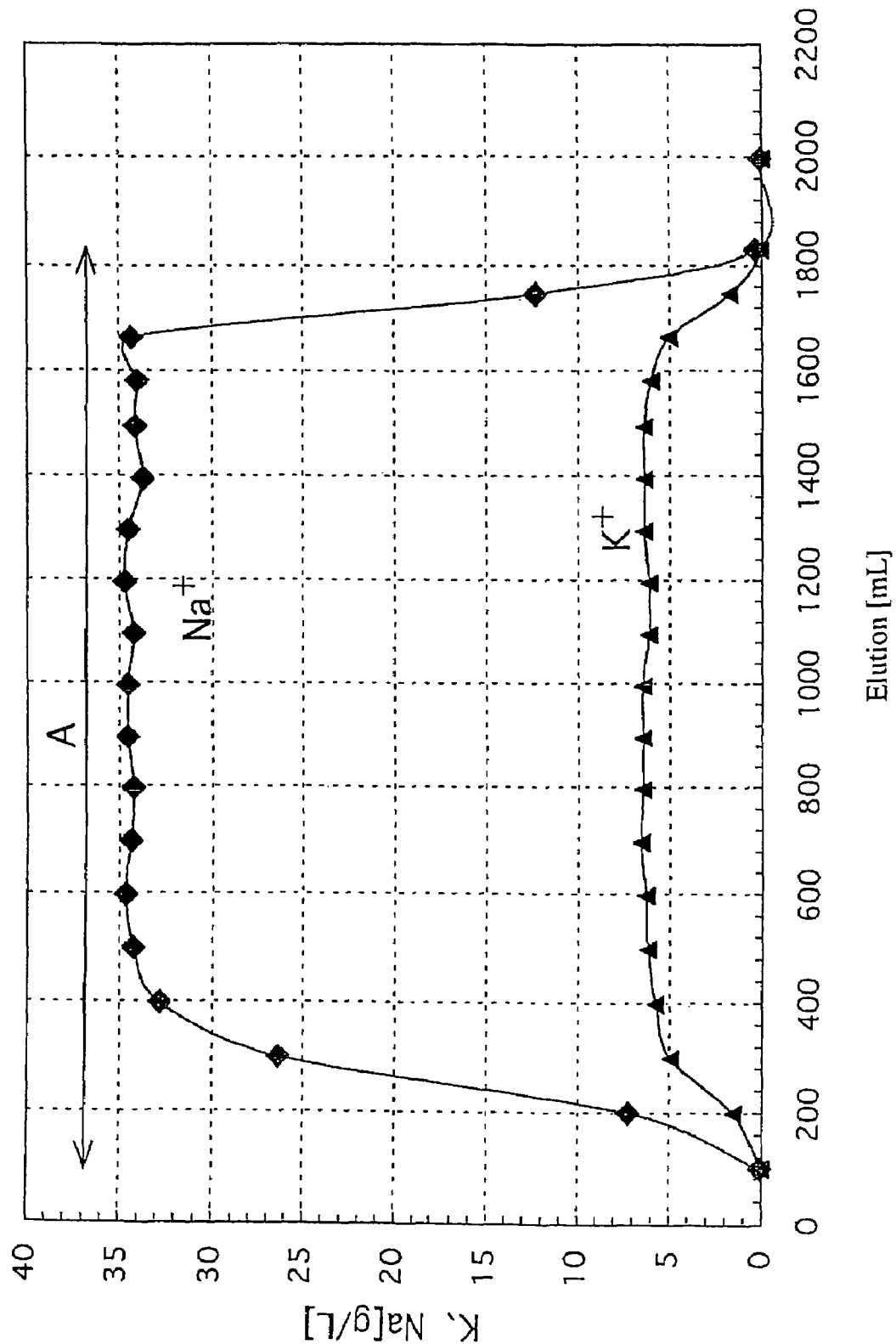
FIG. 2 shows an effluent curve obtained in the potassium ion removal step in Example 1.

Successively, 1500 mL of a 4 W/V % sodium hydroxide aqueous solution was flowed through the glass column at a space velocity of 2 $hr^{-1}$ to desorb potassium ions adsorbed on the cation exchange resin therefrom. Further, 1000 mL of pure water was flowed through the glass column at a space velocity of 2 $hr^{-1}$ to wash the resin. At this time, there was obtained an effluent curve (showing the change in concentrations of potassium ions and sodium ions in an effluent discharged from the column) as shown in FIG. 2. The fraction A of the effluent as shown in FIG. 2 was recovered and subjected to pulp bleaching treatment. The composition of the obtained alkali effluent is shown in Table 2 below.

TABLE 2

| | |
|---|---|
| Na⁺ | 30 [g/L] |
| K⁺ | 5 [g/L] |

Next, a pulp bleaching test was conducted using the above effluent obtained after regenerating the cation exchange resin (Experiments 1 to 3). In the bleaching step, chlorine dioxide bleaching (D1), alkali extraction (Eop: treatment with sodium hydroxide, oxygen and sodium hypochlorite) and chlorine dioxide bleaching (D2) were successively carried out in this order. The addition of the alkali (regeneration effluent) was conducted while controlling the pH value at an outlet of the alkali extraction stage to 11. Bleaching efficiencies and pulp qualities at addition rates of alkali (regeneration effluent) of 1.29% (Experiment 1), 1.03% (Experiment 2) and 1.11% (Experiment 3) are shown in Tables 3 and 4.

COMPARATIVE EXAMPLE 1

The same procedure for pulp bleaching test as defined in Example 1 was conducted except that the regeneration effluent of the cation exchange resin was replaced with sodium hydroxide as currently used, namely fresh sodium hydroxide before being used for regeneration of the cation exchange resin, thereby performing the pulp bleaching test (Experiments 4 to 6). The results are shown in Tables 3 and 4.

The measuring methods and definitions of the respective properties shown in Tables 3 and 4 are as follows.

(1) Brightness:

The brightness is an index of whiteness of pulp or papers, and was measured as brightness by Hunter using a Digital Hunter brightness meter manufactured by Toyo Seiki Co., Ltd. (according to JIS P8123).

(2) Kappa number:

The Kappa number is one of indices showing a cooking degree or a delignification degree of pulp, and was expressed by mL of a $\frac{1}{10}$N potassium permanganate which was consumed per 1 g of absolute dry pulp (according to TAPPI T236).

(3) Viscosity:

The viscosity is an index of an average polymerization degree of cellulose from which pulping degree and deterioration degree upon bleaching can be relatively determined (according to TAPPI T230).

(4) Δ brightness:

The Δ brightness represents the difference in brightness by Hunter between before and after discoloration of pulp, and was measured using a Digital Hunter brightness meter manufactured by Toyo Seiki Co., Ltd.

(5) Δb value:

The Δb value represents the difference in hue b value between before and after discoloration of pulp, and was measured using a color difference meter "Spectrometer SE2000" manufactured by Nippon Denshoku Kogyo Co., Ltd.

(6) ΔE value:

The ΔE value was calculated from the differences in hue L, a and b values measured before and after discoloration of pulp according to the following formula:

$$\Delta E \text{ value} = \sqrt{((\Delta L)^2 + (\Delta a)^2 + (\Delta b)^2)}$$

(7) PC value:

The PC value is one of methods of expressing a discoloration degree, and was calculated from brightness values measured before and after heat-aging test at 105° C. according to the following formula:

$$PC \text{ value} = 100 \times \{(K/S) - (K0/S0)\}$$

wherein K and K0 represent light absorption coefficients after and before discoloration of pulp, respectively; and S and S0 represent light scattering coefficients after and before discoloration of pulp, respectively.

TABLE 3

| | Eop stage | | |
|---|---|---|---|
| | Rate of addition of alkali (%) | Brightness | Kappa number |
| Example 1 | | | |
| Experiment 1 | 1.29 | 71.9 | 2.9 |
| Experiment 2 | 1.03 | 72.2 | 2.7 |
| Experiment 3 | 1.11 | 71.8 | 2.8 |
| Average | 1.14 | 72.0 | 2.8 |
| Comparative Example 1 | | | |
| Experiment 4 | 1.30 | 71.5 | 2.9 |
| Experiment 5 | 1.19 | 72.2 | 2.8 |
| Experiment 6 | 1.37 | 72.0 | 2.8 |
| Average | 1.29 | 71.9 | 2.8 |

TABLE 4

| | D2 stage | |
|---|---|---|
| | Brightness | Viscosity |
| Example 1 | | |
| Experiment 1 | 85.9 | 21 |
| Experiment 2 | 86.3 | 20 |
| Experiment 3 | 86.0 | 21 |
| Average | 86.1 | 21 |
| Comparative Example 1 | | |
| Experiment 4 | 85.8 | 20 |
| Experiment 5 | 86.2 | 20 |
| Experiment 6 | 86.1 | 19 |
| Average | 86.0 | 20 |

| | D2 stage Accelerated heat discoloration degree | | | |
|---|---|---|---|---|
| | Δ brightness | Δb value | ΔE value | PC value |
| Example 1 | | | | |
| Experiment 1 | −1.6 | 1.1 | 1.17 | 0.31 |
| Experiment 2 | −1.4 | 1.2 | 1.20 | 0.26 |
| Experiment 3 | −1.6 | 1.1 | 1.18 | 0.30 |
| Average | −1.5 | 1.1 | 1.18 | 0.29 |
| Comparative Example 1 | | | | |
| Experiment 4 | −1.6 | 1.0 | 1.18 | 0.31 |
| Experiment 5 | −1.5 | 1.1 | 1.17 | 0.28 |
| Experiment 6 | −1.6 | 1.1 | 1.19 | 0.30 |
| Average | −1.6 | 1.1 | 1.18 | 0.29 |

As shown in Tables 3 and 4, from the comparison between the current alkali extraction treatment in which the alkali extraction was conducted using fresh sodium hydroxide (Comparative Example) and the alkali extraction of the present invention in which the regeneration effluent of the cation exchange resin was used as alkali (Example 1), it was confirmed that both the treatments exhibited substantially no difference in pulp brightness upon the alkali extraction (Eop) stage and chlorine dioxide bleaching (D2) stage as well as results of accelerated heat discoloration test for hue (PC value, Δ brightness, Δb value and ΔE value) from each other, and further both the treatments also exhibited substantially no difference in pulp viscosity values upon the chlorine dioxide (D2) stage from each other. As a result, it was confirmed that the regeneration effluent of the cation exchange resin was recycled to the alkali extraction stage and reused therein without problems such as deterioration in quality of the obtained pulp. In addition, it was confirmed that the percentage of addition of alkali to pulp required for controlling the pH value at the outlet of the alkali extraction stage to 11, was 1.29% in the case of the current alkali extraction treatment (Comparative Example 1), whereas the same rate was reduced to 1.14% in the case of the alkali treatment of the present invention using the regeneration effluent (Example 1). That is, it was confirmed that the alkali extraction method of the present invention was substantially identical in quality of the obtained pulp and bleaching property to those using the conventional methods.

INDUSTRIAL APPLICABILITY

As described above, according to the present invention, there can be provided the process for producing kraft pulp which is capable of recovering chemicals in a closed system; preventing, in particular, accumulation of potassium impurities; and effectively utilizing chemicals used in the process. Therefore, the present invention exhibits a remarkable industrial value.

The invention claimed is:

1. A process for producing kraft pulp, which comprises: (A) a cooking step of treating raw chips with a cooking liquor containing sodium hydroxide and sodium sulfide as the main components to convert the chips into pulp; (B) a pulp washing step of washing the resultant pulp, and separating and recovering a black liquor solution containing sodium carbonate and sodium sulfate, which are by-products of the cooking liquor formed during the cooking process; (C) a pulp bleaching step of treating the pulp with a bleaching agent in the presence of alkali; (D) a black liquor solution concentrating step of concentrating the black liquor solution separated and recovered in the pulp washing step (B); (E) a black liquor solution combustion step of burning the concentrated black liquor solution to reduce the sodium sulfate into sodium sulfide and further recovering ashes containing sodium sulfate and sodium carbonate from a combustion exhaust gas generated therein by a dust collector; and (F) a causticization step of treating a green liquor solution as an aqueous solution of a smelted product recovered from the combustion step with calcium oxide to reduce sodium carbonate contained in the green liquor solution to sodium hydroxide, thereby obtaining a white liquor solution, said white liquor solution recovered in the causticization step (F) being recycled to the cooking step (A);

said process further comprising;

(G) a potassium ion removal step of preparing an aqueous solution containing the ashes captured and recovered from the combustion exhaust gas generated in the black liquor solution combustion step (E) by the dust collector and flowing this aqueous solution through a packed bed filled with a Na-type cation exchange organic resin to adsorb and remove potassium ions contained in the aqueous solution; and (H) a regeneration step consisting essentially of treating the cation exchange organic resin used in the potassium ion removal step (G) with an aqueous sodium hydroxide solution to regenerate the cation exchange organic resin, wherein a fraction recovered from the potassium ion removal step (G), which contains a large amount of sodium sulfate and sodium carbonate, is recycled, to the black liquor solution concentrating step (D), and a sodium hydroxide effluent recovered from the regeneration step (H) is recycled to the bleaching step (C).

* * * * *